(12) United States Patent
Halibard

(10) Patent No.: US 9,390,248 B2
(45) Date of Patent: Jul. 12, 2016

(54) SYSTEMS AND METHODS FOR AUTHENTICATING ACCESS TO AN OPERATING SYSTEM BY A USER BEFORE THE OPERATING SYSTEM IS BOOTED USING A WIRELESS COMMUNICATION TOKEN

(71) Applicant: Moishe Halibard, Herzliya (IL)

(72) Inventor: Moishe Halibard, Herzliya (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/127,771

(22) PCT Filed: Aug. 28, 2013

(86) PCT No.: PCT/US2013/056963
§ 371 (c)(1),
(2) Date: Dec. 19, 2013

(87) PCT Pub. No.: WO2015/030742
PCT Pub. Date: Mar. 5, 2015

(65) Prior Publication Data
US 2015/0143508 A1 May 21, 2015

(51) Int. Cl.
| G06F 21/35 | (2013.01) |
| G06F 9/24 | (2006.01) |
| G06F 9/44 | (2006.01) |
| G06F 21/31 | (2013.01) |
| G06F 21/57 | (2013.01) |

(52) U.S. Cl.
CPC *G06F 21/35* (2013.01); *G06F 9/24* (2013.01); *G06F 9/4406* (2013.01); *G06F 21/31* (2013.01); *G06F 21/575* (2013.01)

(58) Field of Classification Search
CPC ......... G06F 21/10; G06F 21/31; G06F 21/35; G06F 21/46; G06F 9/4406; G06F 21/36; G06F 21/575; G06F 9/24
USPC ............................................ 726/18; 713/193
See application file for complete search history.

(56) References Cited

U.S. PATENT DOCUMENTS

| 5,448,045 A | 9/1995 | Clark | |
| 7,231,513 B1 * | 6/2007 | Eydelberg | ........................ 713/2 |

(Continued)

OTHER PUBLICATIONS

International Search Report and Written Opinion received for PCT Patent Application No. PCT/US2013/056963, mailed on May 20, 2014, 14 Pages.

*Primary Examiner* — Matthew Smithers
(74) *Attorney, Agent, or Firm* — Sutherland Asbill & Brennan LLP

(57) ABSTRACT

Certain embodiments herein relate to authenticating access to an operating system by a user before the operating system is booted. Such authentication may be performed by processing information received from a wireless communication token via Near Field Communication (NFC), in one embodiment. The received information may be processed to determine credentials for accessing the operating system, which if validated, may be sent to a Basic Input Output System (BIOS) which may boot the operating system in response. The BIOS may also perform various other functions if authentication is successful, such as decrypting a hard disk on which an operating system is installed before booting the operating system. According to this configuration, a decryption key may be received from the wireless communication token and subsequently sent to the BIOS to enable the decryption and subsequent booting of the operating system.

20 Claims, 3 Drawing Sheets

(56) References Cited

U.S. PATENT DOCUMENTS

| | | | | |
|---|---|---|---|---|
| 8,312,559 B2* | 11/2012 | Walrath | ............... | G06F 21/35 |
| | | | | 726/20 |
| 8,560,822 B1* | 10/2013 | Chan et al. | ............... | 713/1 |
| 2002/0174353 A1* | 11/2002 | Lee | ............... | G06F 21/575 |
| | | | | 713/193 |
| 2008/0083019 A1* | 4/2008 | Wang | ............... | G06F 21/575 |
| | | | | 726/5 |
| 2011/0138166 A1* | 6/2011 | Peszek et al. | ............... | 713/2 |
| 2012/0017271 A1* | 1/2012 | Smith et al. | ............... | 726/19 |
| 2012/0151200 A1 | 6/2012 | Beachem et al. | | |
| 2013/0007873 A1* | 1/2013 | Prakash | ............... | G06F 21/31 |
| | | | | 726/18 |

\* cited by examiner

SYSTEMS AND METHODS FOR AUTHENTICATING ACCESS TO AN OPERATING SYSTEM BY A USER BEFORE THE OPERATING SYSTEM IS BOOTED USING A WIRELESS COMMUNICATION TOKEN

CROSS-REFERENCE TO RELATED APPLICATIONS

This application is a national stage filing under 371 and claims priority to PCT application PCT/US2013/05693, filed Aug. 28, 2013, entitled "Systems and Method for Authenticating Access to an Operating System by a User Before the Operating System is Booted Using a Wireless Communication Token". The foregoing application is incorporated by reference as if fully set forth in its entirety herein.

TECHNICAL FIELD

Embodiments of this disclosure relate generally to user authentication, and more particularly, to authentication via wireless communication.

BACKGROUND

Users of computing devices are oftentimes required to authenticate or present access credentials before they may utilize software applications installed on the computing devices. Existing authentication techniques leverage software that is available after an operating system is booted to simplify authentication for users, such as by receiving authentication information from various devices via a wireless communication protocol. Such software, however, is not available before the operating system is booted, and therefore, may not be leveraged to simplify authentication at such time.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Figure 1:
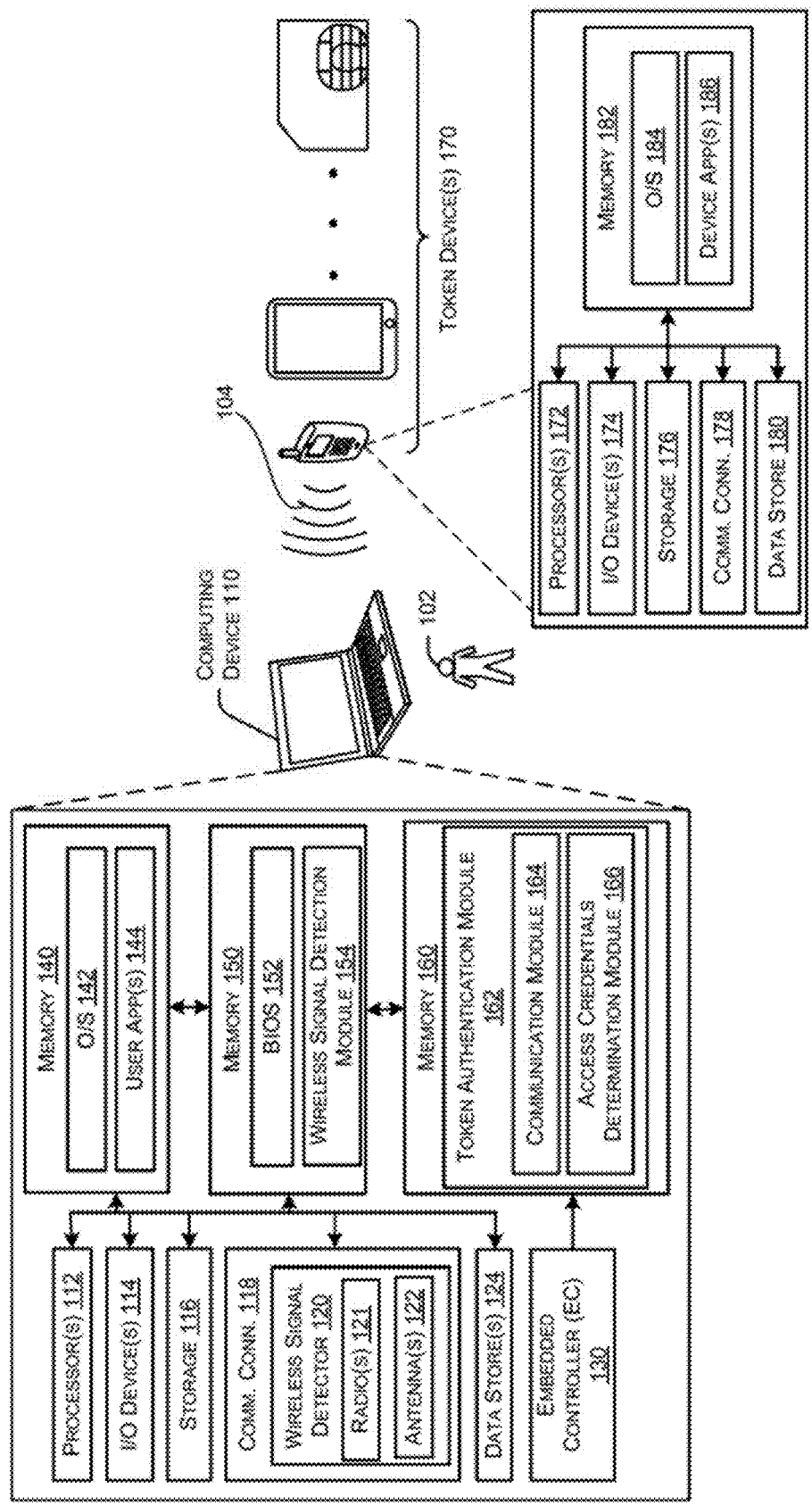
FIG. 1 illustrates an example computing environment for authenticating access to an operating system by a user before the operating system is booted, according to an embodiment of the disclosure.

Certain implementations will now be described more fully below with reference to the accompanying drawings, in which various implementations and/or aspects am shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Certain embodiments herein relate to, among other things, authenticating access to an operating system of a computing device by a user. A user's access to an operating system may be authenticated before the operating system is booted at least in part by using a wireless token device configured to send information that may be used to authenticate the user to the computing device. In certain embodiments herein, such information may be sent to the computing device using Near Field Communication (NFC) in response to a user bringing the token device near, or in contact with, the computing device to enable transmission of the information. Systems and methods described herein may process the received information to authenticate access to an operating system by a user at a time before the operating system is booted, for example, by a Basic Input Output System (BIOS) configured to load or boot the operating system. The BIOS may also perform various related functions to facilitate booting of the operating system, such as decrypting a hard disk on which the operating system is installed, in response to receiving an indication that the token device, and hence access to the operating system by a user, has been successfully authenticated, in one embodiment. Although certain embodiments herein refer to a BIOS, other suitable firmware, software, program modules, etc., that are configured to perform the same or similar processes as a BIOS described herein may exist in other embodiments.

Systems and methods herein may also send login credentials to an operating system after it has been booted to automate a user's login to the operating system, that is, without the user having to enter a login and password or other login credentials. In one embodiment, such login credentials may be the same or similar to information that was used to authenticate a user's access to the operating system before the operating system was booted by the BIOS. In this way, by using an NFC enabled wireless token device for authentication, a user may cause decryption of a hard disk on which an operating system is installed (among other functions), subsequent to booting or loading of the operating system, and may enable automated login to the operating system such that the user may begin utilizing the operating system with no further actions other than bringing the wireless token device near, or in contact with, a computing device. Certain embodiments herein also, however, enable authentication via multiple factors of authentication, such as the user bringing an NFC configured token device near the computing device and providing a user name and password to authenticate access to the operating system before the operating system is booted.

According to one example, a user desiring to access a computing device may bring near to the computing device a wireless token device that stores information that may be used to authenticate the user's access to an operating system (referred to herein as authentication information). The authentication information may include a unique identifier of the token device, information uniquely identifying the user of the token device, or other stored information. Upon receiving the authentication information, for example, via NFC or other wireless protocols, systems and methods herein may determine access credentials for authenticating access to an operating system by the user based at least in part on the authentication information. In one example, a relevant portion of the authentication information may be selected according to information required by a BIOS configured to boot the operating system. Such a relevant portion may be referred to herein as the access credentials, in certain embodiments.

The access credentials may be validated using various algorithms or techniques to determine whether access to the operating system should be granted to the user. In one example, a unique identifier of the token device may be compared to a list of stored, valid token identifiers. A match between the unique identifier and a stored identifier, therefore, may mean that access to the operating system by the user should be granted. In such instances, an access key may be generated and sent to the BIOS to cause the BIOS to boot the operating system or perform related functions to facilitate booting of the operating system. After the operating system has been booted, the access credentials may be sent to the operating system to facilitate logging the user into the operating system.

The above descriptions are for purposes of illustration and are not meant to be limiting. Numerous other examples, configurations, processes, etc., may exist, some of which are described in greater detail below.

FIG. 1 depicts an example computing environment 100 for authenticating access to an operating system by a user before the operating system is booted, according to an embodiment of the disclosure. The example computing environment 100 may include, but is not limited to, a computing device 110 and a token or token device 170. Examples of a computing device 110 may include a desktop computer, a laptop computer, a mobile device, a tablet, etc. Examples of the token device 170 may include the same or similar devices of the computing device 110, as well as smart cards, or other wireless communication devices that may store particular information associated with the token device or a user utilizing the token device, etc.

The token device 170 may receive at least a portion of such information in a signal 104. According to certain embodiments herein, the signal 104 may be a Near Field Communication (NFC) signal that may be transmitted via the NFC protocol. Consistent with NFC, the token device 170 may be brought near the computing device 110 or in contact with the computing device 110 to transmit information via NFC. In other embodiments, the signal 104 may include a wireless fidelity (WiFi) signal, a WiFi Direct signal, a Bluetooth signal, an ultra-wideband (UWB) signal, a ZigBee signal, a Radio Frequency Identification (RFID) signal, (e.g., active or passive RFID), other short-range signals, or other communication signals. The computing device 110 may process at least a portion of the information in the signal 104 to authenticate access to an operating system, software application(s), etc., by a user.

As used herein, the term "device" may refer to any computing component that includes one or more processors that can be configured to execute computer-readable, computer-implemented, or computer-executable instructions. Example devices can include personal computers, server computers, server farms, digital assistants, smart phones, personal digital assistants, digital tablets, smart cards, Internet appliances, application-specific circuits, microcontrollers, minicomputers, transceivers, kiosks, or other processor-based devices. The execution of suitable computer-implemented instructions by one or more processors associated with various devices may form special purpose computers or other particular machines that may implement or facilitate authentication of access to an operating system by a user before the operating system is booted using a wireless communication token.

Various types of networks may facilitate communication between the devices shown in FIG. 1. Such networks may include any number of wired or wireless networks that can enable various computing devices in the example computing environment 100 to communicate with one another. In some embodiments, other networks, intranets, or combinations of different types of networks may be used including, but not limited to, NFC networks, WiFi networks, WiFi Direct networks, Bluetooth® networks, the Internet, intranets, cable networks, cellular networks, landline-based networks, radio networks, satellite networks, other short-range, mid-range, or long-range wireless networks, or other communication mediums connecting multiple computing devices to one another. Thus, while certain embodiments herein relate to authentication via an NFC network, any number of other types of networks, or a combination of these networks, may facilitate authentication of access to an operating system by a user before the operating system is booted using a wireless communication token.

The computing device 110 may include a radio receiver (not shown). A physical layer interface in the radio receiver may include a radio frequency (RF) unit that may be configured to provide for reception of one or more RF signals at one or more frequencies. According to one configuration, the RF unit may include an amplifier, a mixer, a local oscillator, and so forth. The RF unit may be implemented as discrete electronic components, integrated circuits, software-defined radio, or a combination thereof, according to various configurations. The computing device 110 may further include a radio transmitter that may send one or more RF signals to one or more access points. In some configurations, the computing device 110 may include a radio transceiver that may receive and send RF signals. The transceiver (or the receiver and/or the transmitter) may be coupled to one or more antennas (e.g. antennas associated with the computing device 110).

As used herein, the term "before the operating system is booted," or similar terms, may in some embodiments refer to a point in time at which the operating system is fully booted or loaded. An operating system may be fully booted or loaded when the operating system, and/or one or more software applications that may rely on the operating system for operability, may be readily available to a user for performing its intended purposes. An operating system may be considered to be booted when it requests login credentials from a user to utilize the operating system, as used herein in certain embodiments.

The devices in FIG. 1 may include one or more processors configured to communicate with one or more memory devices and various other components or devices. For example, the computing device 110 may include one or more processors 112 and one or more embedded controllers 130. The processors 112 and the embedded controllers 130 may be implemented as appropriate in hardware, software, firmware, or a combination thereof. According to one configuration, one or more processors 112 (CPUs) may execute instructions associated with software in the memory 140, such as an operating system 142 and one or more user applications 144. The CPU 112 may also execute at least a portion of the computer-executable instructions in the Basic Input Output System (BIOS) 152 contained in memory 150. Such instructions may configure the CPU 112 to initialize and test the system hardware components in the computing device 110, among other functions.

One or more embedded controllers 130 may execute instructions associated with software or firmware in the memory 160 to implement or facilitate authenticating access to an operating system by a user before the operating system is booted using a wireless communication token. A wireless signal detector 120 that may be connected to the CPU 112 may receive information from the token device 170. In certain configurations herein, the embedded controller 130 may be located separate from the CPU 112 connected to the wireless signal detector 120 and may receive relatively few inputs, which may enhance the security of the embedded controller 130, and hence, the authentication of a user's access to the operating system 142. An example type of embedded controller 130 may include, but is not limited to, Intel® ME. The one or more processors 172 associated with at least a portion of the token devices 170 may be the same or at least similar to the processor 112, in one embodiment.

Numerous memories or memory devices may exist in the computing device 110 in certain embodiments herein, such as the memories 140, 150, and 160. The memories 140 and 150 may store program instructions that are loadable and executable on the CPU 112, as well as data generated during the execution of these programs. The memory 160 may store program instructions that are loadable and executable on the embedded controller 130, as well as data generated during the execution of these programs. Each of the programs executed by the processors 112 and the embedded controller 130 will be described in greater detail below.

Depending on the configuration and type of computing device 110, the memories 140, 150, and 160 may be volatile, such as random access memory (RAM), static random access memory (SRAM), dynamic random access memory (DRAM); or non-volatile, such as read-only memory (ROM), Electrically Erasable Programmable Read-Only Memory (EEPROM), flash memory, etc. According to one configuration, the memory 140 may be volatile (e.g., RAM) and the memories 150 and 160 may be non-volatile (e.g., flash memory). The memory 182 associated with at least a portion of the token devices 170 may be the same or at least similar to one or more of the memories 140, 150, or 160, in one embodiment.

The storage 116 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The storage 176 associated with at least a portion of the token devices 170 may be the same or at least similar to the storage 116, in one embodiment.

The memories 140, 150, and 160, and the storage 116, both removable and non-removable, are all examples of computer-readable storage media. For example, computer-readable storage media may include volatile and non-volatile, removable and non-removable media implemented in any method or technology for storage of information such as computer-readable instructions, data structures, program modules or other data.

The input/output (I/O) devices 114 may enable a user to interact with the computing device 110 to, among other functions, utilize various software applications, for example, after the user has been authenticated by the processes described herein. The I/O devices 114 may include, but are not limited to, a keyboard, a mouse, a pen, a voice input device, a touch input device, a display, a camera or an imaging device, speakers, or a printer. The I/O devices 174 associated with at least a portion of the token devices 170 may be the same or at least similar to the I/O devices 114, in one embodiment.

The one or more communication connections 118 may allow the computing device 110 to communicate with other devices, such as the token devices 170 and various other devices via one or more wireless and/or wired networks (not shown). In one embodiment, the communication connections 118 may include a wireless signal detector 120. The wireless signal detector 120 may include a wireless system that configures the computing device 110 to send and/or receive various types of wireless signals from the token devices 170. Such a wireless system may include one or more radios 121 and one or more antennas 122, which may include hardware and software for sending and/or receiving wireless signals over various types of wireless networks. Such networks may include, but are not limited to, NFC, WiFi, WiFi Direct, Bluetooth, RFID, UWB, Zigbee, other short-range protocols, etc. The communication connections 178 associated with at least a portion of the token devices 170 may be the same or at least similar to the communication connections 118, in one embodiment. For example, the communication connections 178 may include one or more radios and antennas that may enable at least a portion of the token devices 170 to receive and/or send wireless signals to the computing device 110.

The one or more data stores 124 may store lists, arrays, databases, flat files, etc. In some implementations, the data stores 124 may be stored in a memory external to the computing device 110 but may be accessible via one or more networks, such as with a cloud storage service. The data stores 124 may store information that may facilitate authentication of access to an operating system by a user before the operating system is booted, as described herein. Such information may include, but is not limited to, a list of valid token identifiers for granting access to the operating system by the user, a time range during which the user may be restricted to utilize the operating system and/or other software applications, a login name and/or password, other access credentials, and other information that may be used to validate at least a portion of the information received from the token device 170. The stored information may be compared to at least a portion of the information received from the token device 170 to authenticate the token device 170, in one embodiment.

The above configurations are for purposes of illustration and are not meant to be limiting. Numerous other configurations involving fewer or more processors, memories, software, etc., may exist in other configurations. For example, the BIOS 152 may also reside in the memory 160, where all or at least a portion of its instructions may be executed by the embedded controller 130.

Turning to the contents of the memory 140, the memory 140 may include an operating system 142 and one or more user applications 144, among other software. As used herein, an operating system may refer to a collection of software that manages computer hardware resources and provides common services for computer programs to enable and facilitate the operation of such programs. Example operating systems may include UNIX, Microsoft Windows, Apple OS X, etc. Certain embodiments herein relate to authenticating access to such operating systems by a user before the operating systems are loaded or booted.

The one or more user applications 144 may include various software applications that perform various functions. Such functions may rely on services provided by the operating system 142 and therefore may not be accessible until after the operating system 142 has been booted, according to certain embodiments herein. An example user application 144 may receive and store information that may facilitate authenticating access to the operating system 142 by a user, as described herein. According to one example, a user may utilize the user application 144 to enter a valid list of token identifiers, a login name, a password, or various other information that may be used to facilitate the authentication.

The memory 150 may include a BIOS 152. As used herein, the BIOS 152 may refer to the initial software that is executed by a processor in a computing device (e.g., the computing device 110) when the computing device is powered on. The BIOS 152, or any other BIOS described herein, may not be an operating system to which access by a user is authenticated before the operating system is booted, as described herein. The BIOS 152 may perform various functions to implement or facilitate the processes described herein. Such processes may include, but are not limited to, initializing and testing the system hardware components in the computing device 110, loading or booting the operating system 142, sending a request to a hard disk or other storage device on which the operating system 142 may be installed to decrypt the operating system 142 prior to booting it, communicating with the embedded controller 130 to facilitate authentication of access to the operating system 142 by the user, and facilitating communication between the operating system 142 and software or firmware associated width the embedded controller 130. Examples of such processes will be described in greater detail below.

Although certain embodiments herein refer to a BIOS, other suitable firmware, software, program modules, etc., that are configured to perform the same or similar processes may exist in other embodiments.

The memory 150 may also include a wireless signal detection module 154. The wireless signal detection module 154 may configure the wireless signal detector 120 to send and/or receive wireless signals as described above. The wireless signal detection module 154 may also decrypt and/or demodulate modulated signals received from the token device 170 to access the information in the signals. Various encryption, decryption, modulation, and demodulation techniques may be implemented in various embodiments.

Turning to the contents of the memory 160, the memory 160 may include a token authentication module 162, which may include a communication module 164 and an access credentials determination module 166. Each of these modules may be implemented as individual modules that provide specific functionality associated with authenticating access to an operating system by a user before the operating system is booted using a wireless communication token, as described herein. Alternatively, one or more of the modules may perform all or at least some of the functionality associated with the other modules.

The communication module 164 may send and/or receive various information from the wireless signal detector 120. As described above, the wireless signal detector 120 may receive information from the token devices 170. At least a portion of such information may be sent from the wireless signal detector 120 (e.g., via the wireless signal detection module 154) to the communication module 164. The received information may include information that uniquely identifies the token device 170 and/or the user 102 utilizing the token device 170, among other information. As described, the received information may be used to authenticate access to an operating system by a user before the operating system is booted using a wireless communication token (e.g., the token device 170). Examples of such information will be described in greater detail below.

The communication module 164 may also communicate with the BIOS 152. In one example, the communication module 164 may communicate with the BIOS 152 to determine information required by the BIOS 152 before access to the operating system 142 may be granted, and hence, before the operating system 142 may be booted. Information required by the BIOS 152 may include, but is not limited to, a certain access key, a login name and/or a password, an instruction to boot the operating system 142 or perform a related function, or other information that may notify the BIOS 152 that access to the operating system 142 has been authenticated and that booting of the operating system 142, or one or more related functions (e.g., decrypting a disk on which the operating system 142 is stored), may occur. The communication module 164 may obtain the required information from other sources, such as a memory, a data store, etc., in other embodiments.

The communication module 164 may also communicate with the operating system 142, in one embodiment. Such communication may enable authentication of a user at a login prompt for the operating system 142. In one example, the communication module 164 may send one or more access credentials to the operating system 142 to enable logging into the operating system 142 by the user. In certain embodiments herein, the same or at least a portion of the access credentials that were used to successfully authenticate access to the operating system 142 by a user before the operating system 142 was booted may be sent to the operating system 142 to enable such logging into the operating system 142 without the user being required to supply access credentials after the operating system 142 has been booted.

The access credentials determination module 166 may determine access credentials for authenticating access to the operating system 142 by a user before the operating system is booted using information received from the token device 170. As described, such information may be received by the computing device 110 via NFC (e.g., by the wireless signal detection module 154), in one embodiment. The information may include a unique identification of the token device 170, information uniquely identifying a user of the token device 170, and various other information that will be described in greater detail below. Such information may include access credentials or may be used to generate access credentials for authenticating access to the operating system 142 by the user, as will be described in greater detail below.

In one embodiment, the access credentials determination module 166 may determine access credentials based at least in part on information required by the BIOS 152 to authenticate access to the operating system 142, as described above. In one example, the access credentials determination module 166 may compare the required information to the information received from the token device 170 to identify a relevant portion of the information received from the token device 170 for authenticating access to the operating system 142 by a user. For example, if the BIOS 152 requires a token identifier to authenticate access to the operating system 142, then a value corresponding to a token identifier received from the token device 170 may be identified, and if authenticated successfully (e.g., by the token authentication module 162 as will be described below), may be sent to the BIOS 152, which may boot the operating system upon receiving the token identifier. Various other information may be selected from the information received from the token device 170 for authenticating access to the operating system 142 by the user before the operating system is booted, in other examples.

The token authentication module 162 may authenticate access to the operating system 142 by a user before the operating system is booted based at least in part on the determined access credentials, at least a portion of which may be received via NFC. Such authentication may be performed according to various NFC authentication techniques or algorithms in some embodiments. One such technique may include determining whether access credentials, for example, as determined by the access credentials determination module 166, match stored authentication information. For example, an identifier of a token device 170 may be compared to one or more stored identifiers. If a match between the identifiers is determined, then the token device 170 may be determined to be valid and access to the operating system 142 by the user may be granted before the operating system 142 is booted. If a match does not exist, then the token device 170 may be determined to be invalid, and access to the operating system 142 by the user may be denied. Various other information may be compared to determine whether the token device 170 is valid in other examples.

The authentication module 162 may also generate an access key that may cause the BIOS 152 to boot the operating system 142. The access key may be based on access credentials used to successfully authenticate the token device 170, in one embodiment. At least a portion of the access key may be randomly generated based on the access credentials, while at least another portion of the access key may include at least a portion of the access credentials. Any text, string, or combination of characters, numbers, symbols, etc., may comprise a generated access key in some examples. The BIOS 152, upon receiving the generated access key, may recognize at least a portion of the access key and may subsequently boot the operating system 142, or perform various functions to facilitate booting the operating system 142, such as decrypting a hard disk on which the operating system 142 is installed.

In some embodiments, the authentication module 162 may generate a message that may include various information, such as an indication that access to the operating system 142 was successfully authenticated, one or more access credentials, a decryption key (which may be used to decrypt a hard disk on which the operating system 142 is installed), an instruction for the BIOS 152 to boot the operating system 142 or perform a related function (e.g., decrypt a hard disk), etc. The communication module 164 may send the generated message to the BIOS 152, as described above, in one embodiment.

At least a portion of the token devices 170, such a mobile device, may include various hardware and software components to facilitate the processes described herein. For example, the token device 170 may include an operating system 184 and device application(s) 186. The operating system 184 may be the same or similar to the operating system 142 of the computing device 110, in one embodiment. An example device application 186 may enable a user to cause transmission of an NFC signal that includes information identifying the token device 170, a user utilizing the token device 170, and other information that may be used to authenticate the token device 170. Such information may be sent to the computing device 110 when, for example, a button associated with the device application 186 is pressed, and the token device 170 is brought near or in contact with the computing device 110, in one example. Other device applications 186 may enable a user to view and/or interact with content via the token device 170, such as a mobile device, as a non-limiting example.

Another type of token device 170 may include a smart card. A smart card may include integrated circuits that may facilitate processing applications and storing data for use in identifying the smart card, a user of the smart card, etc. A smart card may also be referred to as a chip card or an integrated circuit card (ICC) and may be sized such that it may fit within a user's wallet or pocket. An example type of smart card may include a contactless smart card, which may include an antenna connected to a main chip in the smart card that may facilitate wireless communication (e.g., via NFC) between the smart card and a destination device. Another example type of a smart card may include a contact smart card, which may require contact with a destination device to enable information to be transmitted to the destination device.

Information stored on the token devices 170 may be encrypted, for example, using a digital certificate as part of a public key infrastructure (PKI) data exchange or various other encryption techniques. The token devices 170 may also generate PKI key pairs that may be used to encrypt or decrypt information stored on the smart card.

The above descriptions associated with FIG. 1 are for purposes of illustration and are not meant to be limiting. Various other examples, configurations, etc., may exist in other embodiments.

Figure 2:
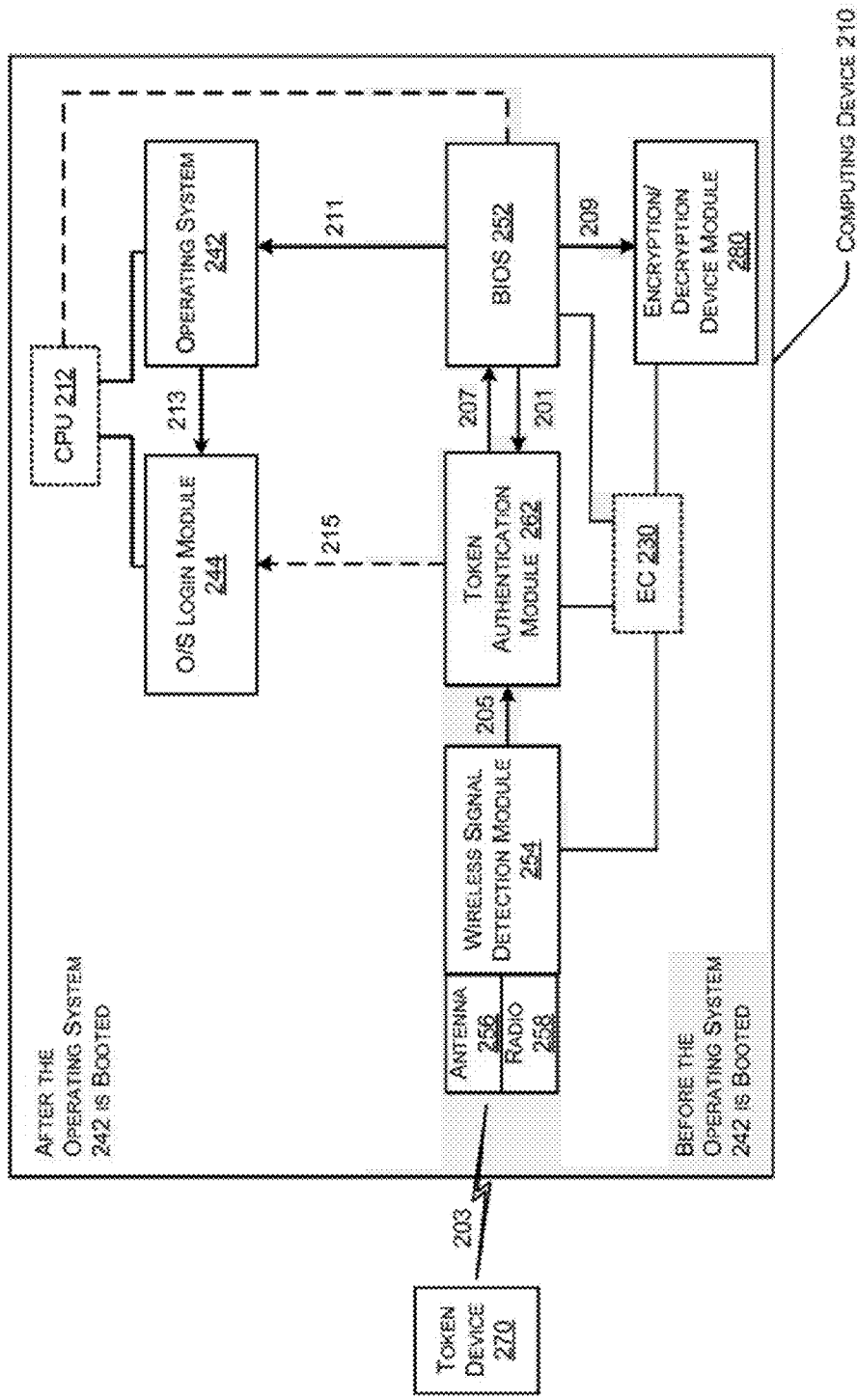
FIG. 2 illustrates a block diagram of an example process for authenticating access to an operating system by a user before the operating system is booted using Near Field Communication (NFC), according to an embodiment of the disclosure.

FIG. 2 illustrates a block diagram of an example process for authenticating access to an operating system by a user before the operating system is booted using the NFC wireless protocol, according to an embodiment of the disclosure. Various other wireless protocols may be used to authenticate access to the operating system in other embodiments. In one embodiment, the computing device 210 may embody the computing device 110 in FIG. 1. As shown in FIG. 2, some processes may be performed before an operating system (e.g., the operating system 142 in FIG. 1) is loaded or booted, while other processes may be performed after the operating system is booted. The bottom portion of FIG. 2 includes processes that may be performed before an operating system is booted, while the top portion of FIG. 2 includes processes that may be performed after the operating system is booted. According to the configuration shown in FIG. 2, the embedded controller 230 may execute instructions associated with the processes in the bottom portion (e.g., the wireless signal detection module 254, the token authentication module 262, the encryption/decryption device module 280, and at least a portion of the BIOS 252). The CPU 212 may execute instructions associated with the processes in the top portion (e.g., the operating system 242 and the operating system login module 244) and the bottom portion (e.g., at least a portion of the BIOS 252). One or more antennas 256 and one or more radios 258 may also be included. Different configurations may exist in other embodiments.

As described above, the BIOS 252 may perform various functions, such as initializing and testing various hardware components in the computing device 210 and booting the operating system 242, among other functions. Prior to booting the operating system 242, decrypting a hard disk on which the operating system 242 is stored, or performing other functions, the BIOS 252 may send a message to the token authentication module 262 (as shown in communication 201) requesting that access to the operating system 242 by a user be authenticated before the operating system 242 is booted. The message from the BIOS 252 may include a request for certain required information such as, but not limited to, a certain access key, a login name and/or a password, an instruction to boot the operating system 242 or perform a related function, or other information that may notify the BIOS 252 that access to the operating system 242 has been authenticated and that booting of the operating system 242, or one or more related functions (e.g., decrypting a disk on which the operating system 242 is stored), may occur.

The required information may be obtained from a source other than the BIOS 252 in some embodiments, such as from a data store (e.g., the data store 124 in FIG. 1) or other storage mechanism. In other embodiments, the BIOS 252 may not require certain information but may instead boot the operating system 242 or perform a related function as a result of receiving an instruction from the token authentication module 262.

The information required by the BIOS 252 may be associated with multiple factors of authentication, in one embodiment. For example, a two-factor authentication may be required, such as authentication of access to the operating system 242 by the user using an identification of the token device 270, as well as using a login name and a password associated with the user. Any number of factors for authentication may exist in other examples.

The token authentication module 262 (e.g., via the communication module 164 in FIG. 1) may receive information associated with the token device 270 and/or a user of the token device 270. As shown in communication 205, such information may be received from the wireless signal detector (e.g., via the wireless signal detection module 254), which may receive the information from the token device 270 via NFC, as shown in communication 203. In one embodiment, the wireless signal detector may embody the wireless signal detector 120 in FIG. 1.

The information received from the token device 270 may include information identifying the token device 270. Such information may include, but is not limited to, one or more unique identifications of the token, such as a Media Access Control (MAC) address, an IP address, a serial number, or other identifier that uniquely identifies the token; one or more decryption keys (e.g., using public-key cryptography, private keys, etc.) that may be used to decrypt information received from the token device 270, as well as decrypt a hard disk or other storage device on which the operating system 242 may be installed; configuration information for the token device 270; or various other information stored by the token device 270 that may facilitate authentication of the token device 270, and hence authentication of access to the operating system 242 by the user before the operating system 242 is booted.

The received information may also, or alternatively, include information identifying the user. Such information may include, but is not limited to, a Social Security Number (SSN) or at least a portion thereof; a user name and/or password associated with the user; full name of the user; street address of the user, demographic information associated with the user; preferences for the user associated with utilizing an operating system, etc. Various other information may be received from the token in other examples.

In some embodiments, the information received from the token device 270 may be encrypted. In these embodiments, the wireless signal detection module 254 may decrypt the information using various techniques, such as via a public key capable of decrypting the received information. The wireless signal detection module 254 may further demodulate signals that are received via NFC modulation.

The token authentication module 262 may authenticate access to the operating system 242 by a user before the operating system 242 is booted using information transmitted from the token device 270 via NFC, in certain embodiments herein. In one example, the information received from the token device 270 may be analyzed to determine a relevant portion of the information for authenticating access to the operating system 242 by the user. In one embodiment, the relevant portion may be determined based at least in part on the information required by the BIOS 252 for authenticating access to the operating system 242. Such a relevant portion may be referred to as access credentials, as used herein. In one example, an access key that includes a particular code embedded into the access key may be required by the BIOS 252. The token authentication module 262 may as a result of successfully authenticating the token device 270, include the particular code in the access key for transmission to the BIOS 252. In other examples, the BIOS 252 may require particular information identifying the token device 270 and/or the user utilizing the token device 270 for authentication. Such particular information may include a unique identifier of the token device 270, among other information. In one example, a value of the unique token identifier associated with an "identifier" tag in the information received from the token device 270 may be obtained from the information and sent to the BIOS 252 to cause booting of the operating system 242. Access credentials may be obtained from the information received from the token device 270 according to such name/value pair formats, in one embodiment. Numerous other examples may exist in which information may be sent from the token authentication module 262 and recognized by the BIOS 252 as providing a valid indication that booting of the operating system 242 may occur.

As described above, the token authentication module 262 may implement various types of algorithms or techniques to validate the token device 270, and hence access to the operating system 242 by the user before the operating system is booted. Such techniques may include, but are not limited to, determining whether a match exists between access credentials and stored information. For example, if an identifier of a token device 270 received via NFC matches a stored token identifier, then the token device 270 may be authenticated, and access to the operating system 242 may be permitted.

Various other types of authentication, algorithms, and/or criteria may be used to authenticate access to the operating system 242 by a user, in other examples. For example, a user's access to the computing device 210 may be restricted according to various conditions, such as a certain time of day; a total number of minutes, hours, or seconds of utilization of the computing device 210; a particular operating system or software application(s), for example, in embodiments in which multiple operating systems may reside on the computing device 210; or according to any number or combination of access criteria required by the BIOS 252 for authentication. If the conditions or requirements for authentication are met, as determined by the token authentication module 262, then the operating system 242 may be booted, and the user may be granted access to the operating system 242. The operating system 242 may not be booted, and hence the user may not be granted access to the operating system 242, if the conditions or requirements are not met.

The token authentication module 262 may send information associated with the results of the authentication to the BIOS 252, as shown in communication 207. For example, the token authentication module 262 may send a message that includes an indication of whether the token device 270 was successfully authenticated. The BIOS 252 may output the indication to a display associated with the computing device 210 for viewing by the user. If authentication of a user was successful, additional information may accompany a message sent to the BIOS 252. Such information may include information required by the BIOS 252 to boot the operating system 242, such as an access key, a user name and/or password, a unique identification of the token device 270, an instruction to boot the operating system 242, etc. The token authentication module 262 may send all or at least a portion of such information to the BIOS 252 in one or more communication events, according to various embodiments. An example of one or more such communication events is described below.

In one example, the token authentication module 262 may generate an access key upon successfully authenticating a user. The access key may include a string where at least a portion may be randomly generated based on at least a portion of the information received from the token device 270, in one embodiment. In other embodiments, the generated access key may be any string, text, number(s), character(s), symbol(s), etc., that may be recognizable by the BIOS 252 such that the BIOS 252 may boot the operating system 242 and/or perform various related functions upon receiving the access key. In some embodiments, the access key may be one or more decryption keys that may be sent to the BIOS 252 and used to decrypt a hard disk or other storage device on which the operating system 242 is installed such that the operating system 242 may be accessed and booted by the BIOS 252.

The token authentication module 262 may implement authentication for multiple factors of authentication. In one embodiment, a single factor of authentication may include authenticating the token device 270 brought near or in contact with the computing device 210 by a user. A second factor of authentication may include a user name and password. Access credentials for both factors of authentication may be sent to the BIOS 252 in one communication, or in iterative fashion, that is, where the token authentication module 262 may send one factor at a time to the BIOS 252 in response to receiving a request for such information from the BIOS 252. Any number of factors may be used to authenticate access to the operating system 242 by a user before the operating system is booted, in other examples.

In response to receiving an indication that access to the operating system 242 by the user was successfully authenticated, the BIOS 252 may perform functions to facilitate booting the operating system 242 prior to doing so, in some embodiments. For example, as shown in communication 209, the BIOS 252 may send an instruction to the encryption/decryption module 280 associated with a hard disk or other storage device on which the operating system 242 is installed to decrypt the contents on the hard disk, including the operating system 242. In one embodiment, the instruction may include a decryption key that may be used by the encryption/decryption module 280 to decrypt the operating system 242. In this way, the operating system 242 may be unlocked such that booting of the operating system 242 by the BIOS 252 may resume or otherwise occur such that it may be accessed by the user.

As shown in communication 211, the BIOS 252 may boot the operating system 242, for example, after the hard disk on which the operating system 242 is installed has been decrypted, in one embodiment. Such booting may be described herein as resuming booting of the operating system 242 because the booting may begin with initialization of system hardware components in the computing device 210, as described above. The booting of the operating system 242 may be halted until access to the operating system 242 has been authenticated based on information received from the token device 270 using NFC.

After the operating system 242 has been booted, the operating system login module 244 associated with the operating system 242 may request login credentials before a user may utilize the operating system 242, as shown in communication 213. The token authentication module 262 may send such login credentials to the operating system login module 244, as shown in communication 215. In one embodiment, the login credentials provided by the token authentication module 262 may be the same as the access credentials that were determined and used to authenticate access to the operating system 242 by the user before the operating system 242 was booted using the NFC wireless protocol. In some embodiments, the login credentials may be stored by the token authentication module 262 at a location where they may be accessed by the operating system login module 244 and used to log the user into the operating system 242.

The above examples are for purposes of illustration and are not meant to be limiting. Various other examples, configurations, etc., may exist in other examples. For example, although only one operating system 242 is shown in FIG. 2, multiple operating systems may exist on the computing device 210. Access to all or at least a portion of the operating systems by a user may be authenticated prior to booting any of the operating systems or a particular operating system, according to various embodiments.

Figure 3:
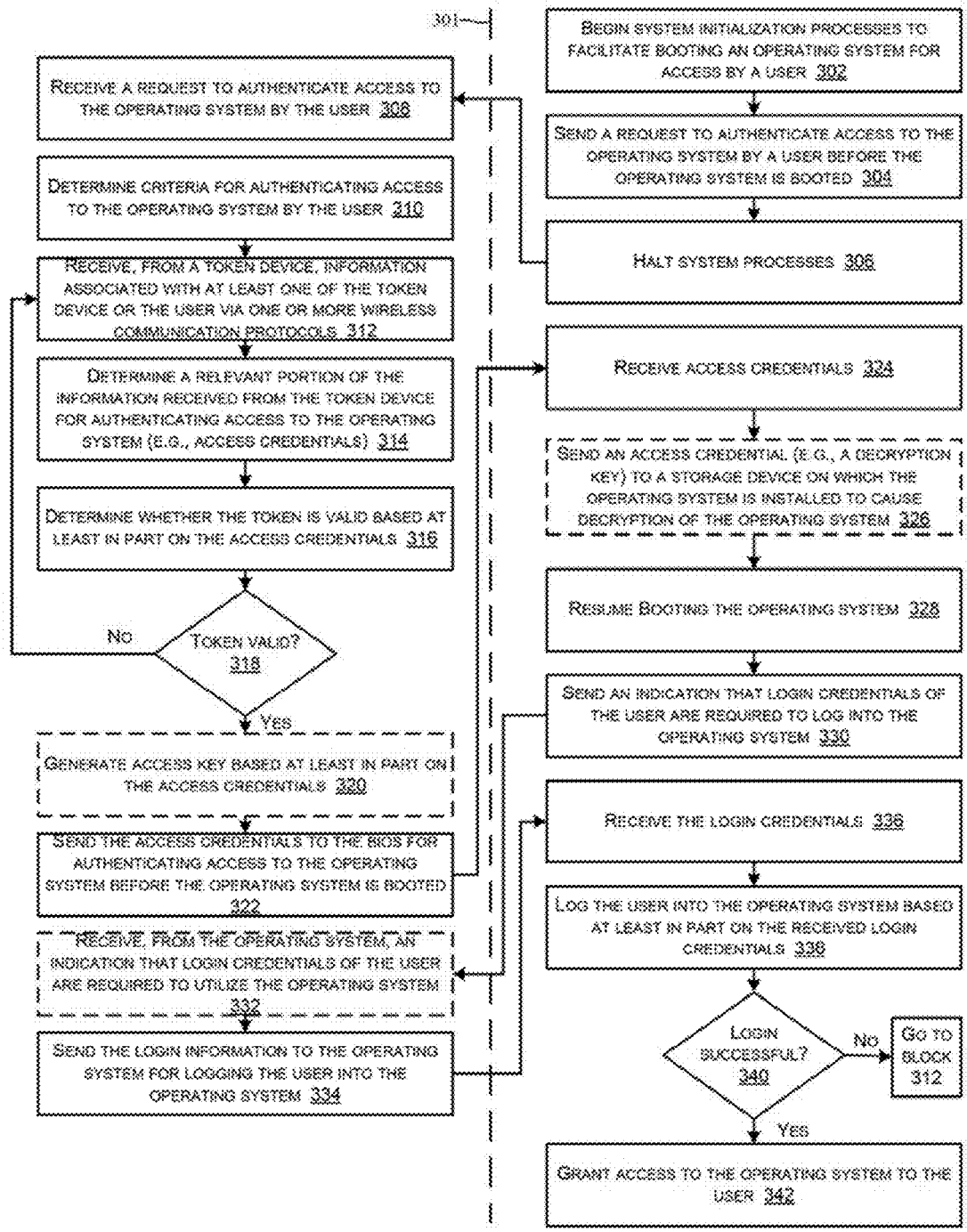
FIG. 3 illustrates a flow diagram of example processes for authenticating access to an operating system by a user before the operating system is booted, according to an embodiment of the disclosure.

FIG. 3 depicts a flow diagram of example processes for authenticating access to an operating system by a user before the operating system is booted, according to an embodiment of the disclosure. The example processes may be implemented by a computing device 110 in FIG. 1, in one embodiment. According to the configuration in FIG. 3, processes on the left side of line 301 may be implemented by the token authentication module 162, while processes on the right side of line 301 may be implemented by other program modules and/or software applications, such as the BIOS 152 and the operating system 142.

The example processes may begin at block 302, where startup or initialization processes associated with booting an operating system installed on a computing device may be performed, for example, by the BIOS 152. At block 304, a request to authenticate access to the operating system by a user before the operating system is booted may be sent (e.g., by the BIOS 152). Processes performed by the BIOS 152 may halt at block 306 pending results of the authentication, in one embodiment.

The request to authenticate access to the operating system by a user may be received (e.g., by the communication module 164) at block 308. The request may include various information that may facilitate the authentication. Such information may include, but is not limited to, a certain access key, a login name and/or a password, an instruction to boot the operating system 142 or perform a related function, or other information that may notify the BIOS 152 that access to the operating system 142 has been authenticated and that booting of the operating system 142, or one or more related functions (e.g., decrypting a disk on which the operating system 142 is stored), may occur. The request may also include other access criteria, such as a restricted time period during which the operating system 142 may be accessed, a number of allowed authentication attempts, etc.

The above criteria for authenticating access to the operating system by the user may be determined (e.g., by the token authentication module 162) at block 310. In some embodiments, authentication requirements may be determined by accessing such criteria from a storage location, such as the memory 150 associated with the BIOS 152. In other embodiments, the token authentication module 162 may submit a request to the BIOS 152 for the criteria and may receive the criteria and other information in response to the request. Yet other embodiments may not involve such criteria but may instead include a request for authentication from the BIOS 152, that is, without any particular required information.

At block 312, information associated with the token (e.g., the token device 170) and/or a user of the token may be received (e.g., by the token authentication module 162) via the NFC wireless protocol, or other wireless protocols. In one embodiment, such information may be received from the wireless signal detector 120 (e.g., via the wireless signal detection module 154), which may receive the information from the token 170 via the NFC wireless protocol. The received information from the token may include information identifying the token and/or the user, among other information that may be used to authenticate access to an operating system by the user before the operating system is loaded.

At block 314, a relevant portion of the information received from the token may be determined and used to authenticate the token, and hence access to the operating system by the user before the operating system is booted. Such a relevant portion may be referred to herein as access credentials. In one embodiment, the access credentials may be determined based at least in part on the criteria for authentication, which may be received in a request for authentication from the BIOS 152 or otherwise via communication with the BIOS 152, as described above. In one embodiment, the access credentials may be the criteria received from the BIOS 152. For example, if the BIOS 152 requires a decryption key, a unique identification of the token, etc., to authenticate access to the operating system by the user, then such information may be parsed or selected from additional information that may be received from the token. In another example in which the BIOS 152 requires a recognizable access key, the token identifier may be utilized (e.g., by the token authentication module 162) to generate such an access key, for example, if the token is successfully authenticated.

At block 316, a determination may be made as to whether the token is valid (e.g., by the token authentication module 162). Various algorithms, techniques, processes, etc., may be implemented to validate the token. In one example, the received token identifier may be compared to one or more stored token identifiers to validate the token. If a match exists between the compared token identifiers, then the token may be determined to be valid. If a match does not exist, then the token may be determined not to be valid. One or more criteria may also be considered in the validation of the token, such as whether access to an operating system is requested during an allowable time of day (e.g., between 10:00 AM and 2:00 PM). Numerous other criteria, authentication techniques, etc., may be implemented in other examples.

If the token is authenticated at block 318, then processing may continue at block 320. If the token is not authenticated, then processing may return to block 312, where information associated with the token and/or the user of the token may be received via the NFC wireless protocol.

At block 320, an access key may be generated (e.g., by the token authentication module 162). In one embodiment, at least a portion of the access key may be randomly generated based at least in part on the access credentials. The generated access key may be recognizable by the BIOS 152 such that the BIOS 152 may resume booting the operating system, and/or perform various functions to facilitate booting the operating system, upon receiving the access key. The generated access key may be considered an access credential such as those described above.

At block 322, at least a portion of the access credentials may be sent to the BIOS 152 for authenticating access to the operating system by a user before the operating system is booted. According to one example, at least a portion of the access credentials sent to the BIOS 152 may include a decryption key that may be used by the BIOS to decrypt a disk on which the operating system is stored. According to some configurations, multiple factors of authentication may be implemented using at least a portion of the access credentials. For example, a first factor of authentication may include validating a generated access key (e.g., by the BIOS 152). The BIOS 152 may further require an additional factor of authentication, in which a user name and password associated with the user may also be used to authenticate access to the operating system. Further factors of authentication may also be required, in which additional access credentials may be sent to the BIOS 152 for authentication of a user. According to various embodiments, access credentials that may be used in multiple factor authentication may be sent in a single communication from the token authentication module 162 to the BIOS 152, or such access credentials may be sent to the BIOS 152 in iterative fashion, that is, one at a time upon receiving a request for a particular access credential from the BIOS 152.

The access credentials may be received (e.g., by the BIOS 152) at block 324. In one example, at block 326, such access credentials may include a decryption key that may be sent from the BIOS 152 to a hard disk or storage device (e.g., the encryption/decryption device module 280 in FIG. 2), where it may be utilized to decrypt an operating system and other contents stored on the storage device.

Booting of the operating system (e.g., by the BIOS 152) may resume at block 328. The booting may resume as a result of successful validation of one or more access credentials by the BIOS 152, and in some examples, after successful decryption of a hard disk on which the operating system is installed.

After the operating system has been booted, a user may be required to log into the operating system before the operating system may be utilized. An indication that such login is required may be sent by the BIOS 152 at block 330. The indication may be received (e.g., by the communication module 164) at block 332. In response to receiving the indication, the token authentication module 162 may send login credentials to the operating system for logging the user into the operating system, at block 334. In some embodiments, the token authentication module 162 may send the login credentials to the operating system, or alternatively, may store the login credentials at a location where it may be accessed by the operating system, without receiving an indication that the operating system requires a login before it may be utilized.

In certain embodiments herein, the same access credentials, or at least a portion thereof, that were used to authenticate access to an operating system by a user before the operating system is booted using information received from a token device via the NFC wireless protocol may serve as the login credentials that may be used to log a user into the operating system. In this way, a user may not be required to log into an operating system after it has been booted but may only be required to authenticate using a token device configured to communicate via the NFC wireless protocol (or other wireless protocol) before the operating system is booted.

The BIOS 152 may receive the login credentials at block 336, and log a user into the operating system based at least in part on the login credentials at block 338. If the login is successful, at block 340, then the user may be granted access to the operating system 142, at block 342. If the login is not successful, then the user may not be granted access to the operating system, and the operating system 142 may remain inaccessible or locked until the user is successfully logged in. Processing may return to block 312 in instances where the login is not successful.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

According to an example embodiment, there is disclosed one or more computer-readable media storing computer-executable instructions that, when executed by at least one processor, configure the at least one processor to perform operations comprising receiving, from a Basic Input Output System (BIOS), a request to authenticate access to an operating system by a user before the operating system is booted. Another operation may include receiving, from a wireless signal detection device before the operating system is booted, information identifying at least one of a token device or a user associated with the token device. The token device may include at least one of a module device or a smart card. The information may be received by the wireless signal detection device from the token device via one or more wireless protocols. The one or more wireless protocols may include Near Field Communication (NFC). Further operations may include determining, based at least in part on the information, one or more access credentials for authenticating access to the operating system by the user before the operating system is booted and determining that the one or more access credentials are valid. A further operation may include sending a message to the BIOS comprising at least one of the one or more access credentials or an instruction to boot the operating system.

In an example embodiment, the one or more access credentials may include an identifier of the token device, and the at least one processor may be further configured to perform the operations of comparing the identifier to one or more stored identifiers and determining that the one or more access credentials are valid when the identifier matches at least one of the stored identifiers. In another example embodiment, the one or more access credentials may include a decryption key received in the information from the token device. The decryption key may enable decryption of a hard disk on which the operating system is installed before the operating system is booted. The token device may include at least one of a mobile device or a smart card, and wherein the information is received from the token device via at least one of NFC, ultra-wideband (UWB) communication, Bluetooth communication, or Zigbee communication.

In an example embodiment, the at least one processor may be further configured to perform the operations comprising receiving an indication that the operating system is booted, and after receiving the indication, sending the one or more access credentials to the operating system to log the user into the operating system. In another example embodiment, the at least one processor may be further configured to perform the operations comprising generating an access key based at least in part on the information received from the token device and sending the access key in the message to the BIOS, the access key causing the BIOS to boot the operating system.

According to another example embodiment, there is disclosed a device that includes one or more radios, one or more antennas, at least one memory that stores computer-executable instructions and at least one processor configured to access the at least one memory, wherein the at least one processor is configured to execute the computer-executable instructions to receive, from a Basic Input Output System (BIOS), a request to authenticate access to an operating system by a user before the operating system is booted. The at least one processor may also be configured to receive, from a wireless signal detection device before the operating system is booted, information identifying at least one of a token device or a user associated with the token device. The information may be received by the wireless signal detection device from the token device via Near Field Communication (NFC).

Further operations may include determining, based at least in part on the information, one or more access credentials for authenticating access to the operating system by the user before the operating system is booted, and determining that the one or more access credentials are valid. A further operation may include sending a message to the BIOS comprising at least one of the one or more access credentials or an instruction to boot the operating system. In one embodiment, the at least one processor may include a first processor, and the device may include a second processor different from the first processor. The second processor may execute computer-executable instructions associated with the operating system.

In an example embodiment, the one or more access credentials may include an identifier of the token device, and the at least one processor may be configured to execute the computer-executable instructions to compare the identifier to one or more stored identifiers and determine that the one or more access credentials are valid when the identifier matches at least one of the stored identifiers. The one or more access credentials may also include a decryption key received in the information from the token device. The decryption key may enable decryption of a hard disk on which the operating system is installed before the operating system is booted.

In another example embodiment, the at least one processor may be further configured to receive an indication that the operating system is booted and after receiving the indication, send the one or more access credentials to the operating system to log the user into the operating system. The at least one processor may also be further configured to generate an access key based at least in part on the information received from the token device and send the access key in the message to the BIOS. The access key may cause the BIOS to boot the operating system.

According to another example embodiment, there is disclosed a method that includes receiving, from a software application configured to boot an operating system, a request to authenticate access to an operating system by a user before the operating system is booted. The method may also include receiving, from a wireless signal detection device before the operating system is booted, information identifying at least one of a token device or a user associated with the token device. The token device may include at least one of a mobile device or a smart card. The information may be received by the wireless signal detection device from the token device via one or more wireless protocols. The method may also include determining, based at least in part on the information, one or more access credentials for authenticating access to the operating system by the user before the operating system is booted. The method may further include determining that the one or more access credentials are valid and sending a message to the software application comprising at least one of the one or more access credentials or an instruction to boot the operating system.

In one embodiment, the one or more access credentials may include an identifier of the token device, and the method may further include comparing the identifier to one or more stored identifiers and determining that the one or more access credentials are valid when the identifier matches at least one of the stored identifiers. In another embodiment, the one or more access credentials may include a decryption key received in the information from the token device. The decryption key may enable decryption of a hard disk on which the operating system is installed before the operating system is booted.

In another example embodiment, the method may further include receiving an indication that the operating system is booted and, after receiving the indication, sending the one or more access credentials to the operating system to log the user into the operating system. The method may further include generating an access key based at least in part on the information received from the token device and sending the access key in the message to the BIOS, the access key causing the BIOS to boot the operating system.

According to another example embodiment, there is disclosed a device for authenticating access to an operating system. The device may include one or more radios and one or more antennas. The device may also include means for receiving, from a Basic Input Output System (BIOS), a request to authenticate access to an operating system by a user before the operating system is booted. The device may also include means for receiving, from a wireless signal detection device before the operating system is booted, information identifying at least one of a token device or a user associated with the token device. The information may be received by the wireless signal detection device from the token device via one or more wireless protocols. The one or more wireless protocols may include Near Field Communication (NFC), in one embodiment. The device may further include means for determining, based at least in part on the information, one or more access credentials for authenticating access to the operating system by the user before the operating system is booted. The one or more access credentials include an identifier of the token device, in one embodiment. The device may further include means for determining that the one or more access credentials are valid and means for sending a message to the BIOS comprising at least one of the one or more access credentials or an instruction to boot the operating system.

In an example embodiment, the device may also include means for comparing the identifier to one or more stored identifiers and means for determining that the one or more access credentials are valid when the identifier matches at least one of the stored identifiers. The one or more access credentials may include a decryption key received in the information from the token device, and wherein the decryption key enables decryption of a hard disk on which the operating system is installed before the operating system is booted. The token device may include at least one of a mobile device or a smart card. The information may be received from the token device via at least one of NFC, ultra-wideband (UWB) communication, Bluetooth communication, or Zigbee communication.

In another example, embodiment, the device may include means for receiving an indication that the operating system is booted, and after receiving the indication, means for sending the one or more access credentials to the operating system to log the user into the operating system. The device may further include means for generating an access key based at least in part on the information received from the token device and means for sending the access key in the message to the BIOS, the access key causing the BIOS to boot the operating system.

According to another example embodiment, there is disclosed a for authenticating access to an operating system. The system may include at least one memory that stores computer-executable instructions and at least one processor configured to access the at least one memory, wherein the at least one processor is configured to execute the computer-executable instructions to receive, from a Basic Input Output System (BIOS), a request to authenticate access to an operating system by a user before the operating system is booted. The at least one processor may also be configured to receive, from a wireless signal detection device before the operating system is booted, information identifying at least one of a token device or a user associated with the token device. The information may be received by the wireless signal detection device from the token device via Near Field Communication (NFC).

Further operations may include determining, based at least in part on the information, one or more access credentials for authenticating access to the operating system by the user before the operating system is booted, and determining that the one or more access credentials are valid. A further operation may include sending a message to the BIOS comprising at least one of the one or more access credentials or an instruction to boot the operating system. In one embodiment, the at least one processor may include a first processor, and the device may include a second processor different from the first processor. The second processor may execute computer-executable instructions associated with the operating system.

In an example embodiment, the one or more access credentials may include an identifier of the token device, and the at least one processor may be configured to execute the computer-executable instructions to compare the identifier to one or more stored identifiers and determine that the one or more access credentials are valid when the identifier matches at least one of the stored identifiers. The one or more access credentials may also include a decryption key received in the information from the token device. The decryption key may enable decryption of a hard disk on which the operating system is installed before the operating system is booted.

In another example embodiment, the at least one processor may be further configured to receive an indication that the operating system is booted and after receiving the indication, send the one or more access credentials to the operating system to log the user into the operating system. The at least one processor may also be further configured to generate an access key based at least in part on the information received from the token device and send the access key in the message to the BIOS. The access key may cause the BIOS to boot the operating system.

According to another example embodiment, there is disclosed an apparatus for authenticating access to an operating system. The apparatus may include one or more radios and one or more receivers. The apparatus may also include means for receiving, from a software application configured to boot an operating system, a request to authenticate access to an operating system by a user before the operating system is booted. The apparatus may also include means for receiving, from a wireless signal detection device before the operating system is booted, information identifying at least one of a token device or a user associated with the token device. The token device may include at least one of a mobile device or a smart card. The information may be received by the wireless signal detection device from the token device via one or more wireless protocols. The apparatus may also include means for determining, based at least in part on the information, one or more access credentials for authenticating access to the operating system by the user before the operating system is booted. The apparatus may further include means for determining that the one or more access credentials are valid and means for sending a message to the software application comprising at least one of the one or more access credentials or an instruction to boot the operating system.

In one embodiment, the one or more access credentials may include an identifier of the token device, and the at least one processor may be further configured to perform the operations comprising comparing the identifier to one or more stored identifiers and determining that the one or more access credentials are valid when the identifier matches at least one of the stored identifiers. In another embodiment, the one or more access credentials may include a decryption key received in the information from the token device. The decryption key may enable decryption of a hard disk on which the operating system is installed before the operating system is booted.

In another example embodiment, the apparatus may further include means for receiving an indication that the operating system is booted and, after receiving the indication, means for sending the one or more access credentials to the operating system to log the user into the operating system. The apparatus may further include means for generating an access key based at least in part on the information received from the token device and means for sending the access key in the message to the BIOS, the access key causing the BIOS to boot the operating system.

According to another example embodiment, there is disclosed one or more computer-readable media storing computer-executable instructions that, when executed by at least one processor, configure the at least one processor to perform operations comprising receiving, from a software application configured to boot an operating system, a request to authenticate access to an operating system by a user before the operating system is booted. The at least one processor may also be configured to perform the operations comprising receiving, from a wireless signal detection device before the operating system is booted, information identifying at least one of a token device or a user associated with the token device. The token device may include at least one of a mobile device or a smart card. The information may be received by the wireless signal detection device from the token device via one or more wireless protocols. The at least one processor may also be configured to perform the operations comprising determining, based at least in part on the information, one or more access credentials for authenticating access to the operating system by the user before the operating system is booted. The at least one processor may also be configured to perform the operations comprising determining that the one or more access credentials are valid and sending a message to the software application comprising at least one of the one or more access credentials or an instruction to boot the operating system.

In one embodiment, the one or more access credentials may include an identifier of the token device, and the at least one processor may be further configured to perform the operations comprising comparing the identifier to one or more stored identifiers and determining that the one or more access credentials are valid when the identifier matches at least one of the stored identifiers. In another embodiment, the one or more access credentials may include a decryption key received in the information from the token device. The decryption key may enable decryption of a hard disk on which the operating system is installed before the operating system is booted.

In another example embodiment, the at least one processor may also be configured to perform the operations comprising receiving an indication that the operating system is booted and, after receiving the indication, sending the one or more access credentials to the operating system to log the user into the operating system. The at least one processor may also be configured to perform the operations comprising generating an access key based at least in part on the information received from the token device and sending the access key in the message to the BIOS, the access key causing the BIOS to boot the operating system.

What is claimed is:

1. One or more non-transitory computer-readable media storing computer-executable instructions that, when executed by at least one processor, configure the at least one processor to perform operations comprising:
receiving, from a Basic Input Output System (BIOS), a request at a first time to authenticate access to an operating system by a user before the operating system is booted;
receiving, from a wireless signal detection device before the operating system is booted, information identifying at least one of a token device or a user associated with the token device, wherein the information is received by the wireless signal detection device from the token device via one or more wireless protocols, wherein the token device comprises a wireless device associated with the user requesting access to the operating system;
determining the first time meets one of one or more criteria, wherein the one or more criteria include a predetermined allowable time for accessing the operating system;
determining, based at least in part on the information, one or more access credentials for authenticating access to the operating system by the user before the operating system is booted;
determining that the one or more access credentials are valid; and
sending a message to the BIOS comprising at least one of the one or more access credentials or an instruction to boot the operating system.

2. The one or more computer-readable media of claim 1, wherein the one or more wireless protocols comprise Near Field Communication (NFC).

3. The one or more computer-readable media of claim 1, wherein the one or more access credentials comprise an identifier of the token device, wherein the at least one processor is further configured to perform the operations comprising:
comparing the identifier to one or more stored identifiers; and
determining that the one or more access credentials are valid when the identifier matches at least one of the stored identifiers.

4. The one or more computer-readable media of claim 1, wherein the one or more access credentials comprise a decryption key received in the information from the token device, and wherein the decryption key enables decryption of a hard disk on which the operating system is installed before the operating system is booted.

5. The one or more computer-readable media of claim 1, the at least one processor further configured to perform the operations comprising:
receiving an indication that the operating system is booted; and
after receiving the indication, sending the one or more access credentials to the operating system to log the user into the operating system.

6. The one or more computer-readable media of claim 1, the at least one processor further configured to perform the operations comprising:
generating an access key based at least in part on the information received from the token device; and
sending the access key in the message to the BIOS, the access key causing the BIOS to boot the operating system.

7. The one or more computer-readable media of claim 1, wherein the token device comprises at least one of a mobile device or a smart card, and wherein the information is received from the token device via at least one of NFC, ultra-wideband (UWB) communication, Bluetooth communication, or Zigbee communication.

8. A device comprising:
one or more radios;
one or more antennas;
at least one memory that stores computer-executable instructions; and
at least one processor configured to access the at least one memory, wherein the at least one processor is configured to execute the computer-executable instructions to:
receive, from a Basic Input Output System (BIOS), a request at a first time to authenticate access to an operating system by a user before the operating system is booted;
receive, from a wireless signal detection device before the operating system is booted, information identifying at least one of a token device or a user associated with the token device, wherein the information is received by the wireless signal detection device from the token device via Near Field Communication (NFC), wherein the token device comprises a wireless device associated with the user requesting access to the operating system;
determine one or more validation criteria, wherein the one or more validation criteria include at least in part a predetermined allowable time for accessing the operating system;
determine, based at least in part on the information, one or more access credentials for authenticating access to the operating system by the user before the operating system is booted;
determine that the one or more access credentials are valid; and
send a message to the BIOS comprising at least one of the one or more access credentials or an instruction to boot the operating system.

9. The device of claim 8, wherein the at least one processor comprises a first processor, the device further comprising a second processor different from the first processor, wherein the second processor executes computer-executable instructions associated with the operating system.

10. The device of claim 8, wherein the one or more access credentials comprise an identifier of the token device, wherein the at least one processor is further configured to execute the computer-executable instructions to:
compare the identifier to one or more stored identifiers; and
determine that the one or more access credentials are valid when the identifier matches at least one of the stored identifiers.

11. The device of claim 8, wherein the one or more access credentials comprise a decryption key received in the information from the token device, and wherein the decryption key enables decryption of a hard disk on which the operating system is installed before the operating system is booted.

12. The device of claim 8, the at least one processor further configured to execute the computer-executable instructions to:
receive an indication that the operating system is booted; and
after receiving the indication, send the one or more access credentials to the operating system to log the user into the operating system.

13. The device of claim 8, the at least one processor further configured to execute the computer-executable instructions to:
generate an access key based at least in part on the information received from the token device; and send the access key in the message to the BIOS, the access key causing the BIOS to boot the operating system.

14. The device of claim 8, wherein the token device comprises at least one of a mobile device or a smart card.

15. A method comprising:
receiving, from a software application configured to boot an operating system, a request at a first time to authenticate access to an operating system by a user before the operating system is booted;
receiving, from a wireless signal detection device before the operating system is booted, information identifying at least one of a token device or a user associated with the token device, wherein the information is received by the wireless signal detection device from the token device via one or more wireless protocols, wherein the token device comprises a wireless device associated with the user requesting access to the operating system;
determining the first time meets one of one or more criteria, wherein the one or more criteria include a predetermined allowable time for accessing the operating system;
determining, based at least in part on the information, one or more access credentials for authenticating access to the operating system by the user before the operating system is booted;
determining that the one or more access credentials are valid; and
sending a message to the software application comprising at least one of the one or more access credentials or an instruction to boot the operating system.

16. The method of claim 15, wherein the one or more access credentials comprise an identifier of the token device, wherein the at least one processor is further configured to perform the operations comprising:
comparing the identifier to one or more stored identifiers; and
determining that the one or more access credentials are valid when the identifier matches at least one of the stored identifiers.

17. The method of claim 15, wherein the one or more access credentials comprise a decryption key received in the information from the token device, and wherein the decryption key enables decryption of a hard disk on which the operating system is installed before the operating system is booted.

18. The method of claim 15, further comprising:
receiving an indication that the operating system is booted; and
after receiving the indication, sending the one or more access credentials to the operating system to log the user into the operating system.

19. The method of claim 15, further comprising:
generating an access key based at least in part on the information received from the token device; and
sending the access key in the message to the BIOS, the access key causing the BIOS to boot the operating system.

20. The method of claim 15, wherein the token device comprises at least one of a mobile device or a smart card.

* * * * *